United States Patent
Muramatsu

(10) Patent No.: US 7,876,367 B2
(45) Date of Patent: Jan. 25, 2011

(54) IMAGING APPARATUS

(75) Inventor: Masaru Muramatsu, Kawasaki (JP)

(73) Assignee: Nikon Corporation, Tokyo (JP)

( * ) Notice: Subject to any disclaimer, the term of this patent is extended or adjusted under 35 U.S.C. 154(b) by 379 days.

(21) Appl. No.: 12/222,169

(22) Filed: Aug. 4, 2008

(65) Prior Publication Data

US 2009/0040338 A1 Feb. 12, 2009

(30) Foreign Application Priority Data

Aug. 6, 2007 (JP) ............................ 2007-204098

(51) Int. Cl.
H04N 5/232 (2006.01)
H04N 5/202 (2006.01)
(52) U.S. Cl. .................... 348/229.1; 348/254
(58) Field of Classification Search ............... 348/229.1
See application file for complete search history.

(56) References Cited

U.S. PATENT DOCUMENTS

2006/0127113 A1* 6/2006 Sato ............................ 399/49
2007/0223908 A1* 9/2007 Sakamoto .................... 396/234

FOREIGN PATENT DOCUMENTS

JP B2-2663189 6/1997
JP A-2002-084455 3/2002

* cited by examiner

Primary Examiner—James M Hannett
(74) Attorney, Agent, or Firm—Oliff & Berridge, PLC

(57) ABSTRACT

An imaging apparatus includes a selecting part selecting a first mode where correction of dark area gradation is not performed or a second mode where the correction is performed, and a correcting part performing the correction of improving lightness of dark area gradation of an image data when the second mode is selected; wherein an exposure calculating part calculates a brightness value for exposure control by calculating at least one of the maximum brightness value, the average brightness value, and a central part brightness value based on an output of a photometry part and by adding results by weighting addition; and determines a correction value by adding the results by weighting addition and corrects the brightness value for exposure control based on the correction value if the second mode is selected. Therefore, optimum exposure adjustment that depends on the correction can be performed.

5 Claims, 8 Drawing Sheets

IMAGING APPARATUS

CROSS-REFERENCE TO RELATED APPLICATIONS

This application is based upon and claims the benefit of priority from Japanese Patent Application No. 2007-204098, filed on Aug. 6, 2007, the entire contents of which are incorporated herein by reference.

BACKGROUND

1. Field

The present embodiments relate to an imaging apparatus which picks up an image of a subject to generate image data.

2. Description of Related Art

Conventionally, various technologies with regard to exposure adjustment of an imaging apparatus have been devised. For example, in inventions of Japanese Unexamined Patent Application Publication No. 2002-84455, when a gradation conversion characteristic is switched, by switching a target value of exposure control depending on a selected gradation characteristic, an output level is kept constant.

Moreover, there has been known a phenomenon that dark area gradation of image data is blacked out by shooting a subject having large difference in brightness. Therefore, in inventions of Japanese Patent No. 2,663,189, gradation is compressed by increasing a gain of dark area gradation, resulting in improvement of blacked-out.

In the inventions of Japanese Unexamined Patent Application Publication No. 2002-84455, regardless of a brightness pattern of a subject, a constant exposure target value that depends on the gradation conversion characteristic is employed. Therefore, when, like gradation compression of the inventions of Japanese Patent No. 2,663,189, optimum exposure adjustment differs depending on the brightness pattern of the subject, proper exposure adjustment cannot be performed.

SUMMARY

A proposition of an imaging apparatus is to perform optimum exposure adjustment that depends on correction of dark area gradation.

In order to achieve the above-mentioned proposition, an imaging apparatus includes a photometry part performing photometry of a subject, an exposure calculating part setting an exposure condition based on a photometry result of the photometry part, an image pickup part picking up an image of the subject according to the exposure condition and generating image data, a selecting part selecting any one of a first photographic mode where correction of dark area gradation of the image data is not performed and a second photographic mode where correction of dark area gradation of the image data is performed, and a correcting part performing a correction of improving lightness of dark area gradation of the image data generated by the image pickup part when the second photographic mode is selected; wherein, the exposure calculating part calculates a brightness value for exposure control as the exposure condition by calculating at least one of the maximum brightness value, the average brightness value, and a representative brightness value corresponding to the central part of the subject based on an output of the photometry part and by adding calculated results by weighting addition. If the second photographic mode is selected, the exposure calculating part determines a correction value by adding the calculated results by weighting addition and corrects the brightness value for exposure control based on the correction value.

In addition, the exposure calculating part may change each weight when determining the correction value by calculation, depending on the lightness improvement amount in the correcting part.

Moreover, the exposure calculating part may add a first fixed value to a result obtained by adding the calculated results by weighting addition when calculating the brightness value for exposure control. If the second photographic mode is selected, the exposure calculating part may add a second fixed value to a result obtained by adding the calculated results by weighting addition while calculating the correction value.

Moreover, the exposure calculating part may change at least one of the first fixed value and the second fixed value, depending on the lightness improvement amount in the correcting part.

Moreover, the imaging apparatus may include a light emission part illuminating the subject, and a luminescence amount calculating part calculating luminescence amount when performing light emission by the light emission part, wherein the luminescence amount calculating part may correct the luminescence amount based on the correction value if the second photographic mode is selected.

DETAILED DESCRIPTION OF THE EMBODIMENTS

Hereinafter, with reference to drawings, an embodiment will be described. In the following embodiment, an example of a camera will be described using a single lens reflex type camera.

Figure 1:
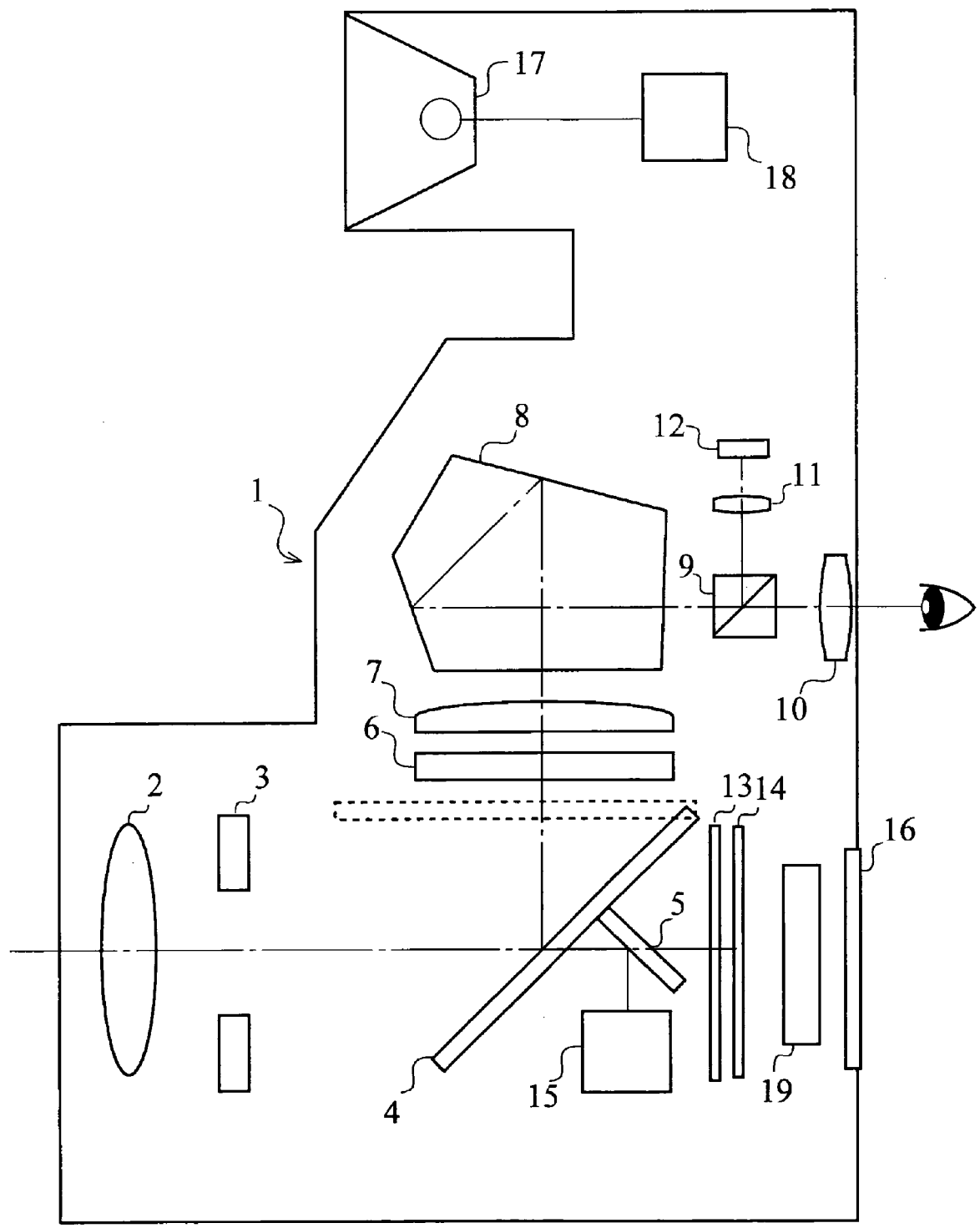
FIG. 1 is a figure illustrating a configuration of an electronic camera 1 of the present embodiment.

FIG. 1 is a figure illustrating the configuration of an electronic camera 1 of the present embodiment. As illustrated in FIG. 1, the electronic camera 1 includes a photographic lens 2, an aperture diaphragm 3, a quick return mirror 4, a sub mirror 5, a diffusing screen 6, a condenser lens 7, a pentaprism 8, a beam splitter 9, an eyepiece lens 10, an imaging lens 11, a photometry sensor 12, a shutter 13, an image sensor 14, and a focus detecting part 15.

Figure 2:
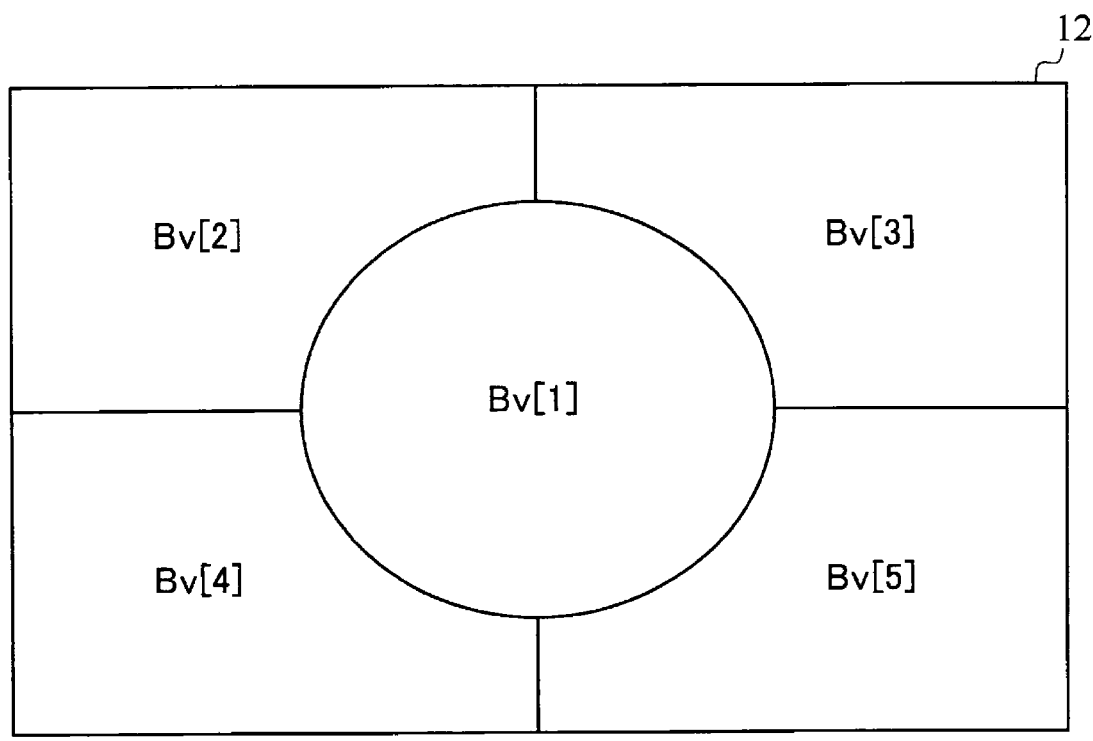
FIG. 2 is a diagram illustrating a photometry sensor 12.

The photometry sensor 12 is a five-division photometry sensor illustrated in FIG. 2. The image sensor 14 is a semiconductor device, such as, for example, a CCD (Charge Coupled Device) and a CMOS (Complementary Metal Oxide Semiconductor). The focus detecting part 15 performs focus detection in a scheme of, for example, phase difference to detect the focused state of the photographic lens 2. Moreover, based on brightness detected by the photometry sensor 12, the electronic camera 1 performs focus detection in a contrast scheme to detect the focused state of the photographic lens 2. It is preferable that whether the focus detection in a phase difference scheme or the focus detection in a contrast scheme should be performed can be set depending on user's operation. Moreover, a configuration may also be used in which the focused state of the photographic lens 2 is detected by combination of the focus detection in the phase difference scheme or the focus detection in the contrast scheme.

Moreover, the electronic camera 1 further includes a monitor 16 such as a liquid crystal display monitor which displays an image generated by way of image pickup, a light emission part 17 which illuminates a subject, a light emission controlling part 18 which controls the light emission part 17 and a controlling part 19 which controls each of the parts. Setting ON/OFF of luminescence by the light emission part 17, may be performed manually based on user's instruction, or may be performed automatically by the controlling part 19. Moreover, it is preferred that manual setting and automatic setting can be switched based on user's instruction. The controlling part 19 includes an un-illustrated memory therein on which a program for controlling each of the parts is recorded in advance.

At the time of non-shooting, i.e., when shooting is not performed, as illustrated in FIG. 1, the quick return mirror 4 is arranged at an angle of 45°. Light flux that passed through the photographic lens 2 and the aperture diaphragm 3, is then reflected by the quick return mirror 4 to be led to the eyepiece lens 10 through the diffusing screen 6, the condenser lens 7, the pentaprism 8, and the beam splitter 9. A user confirms an image composition by viewing the subject image through the eyepiece lens 10. On the other hand, light flux that is divided upward by the beam splitter 9, is re-imaged on the image pickup plane of the photometry sensor 12 through the imaging lens 11. Moreover, light flux that passed through the quick return mirror 4, is led to the focus detecting part 15 through the sub mirror 5.

On the other hand, at the time of shooting, the quick return mirror 4 is evacuated to the position illustrated by dashed lines to open the shutter 13, and thereby the light flux from the photographic lens 2 is led to the image sensor 14.

Figure 3:
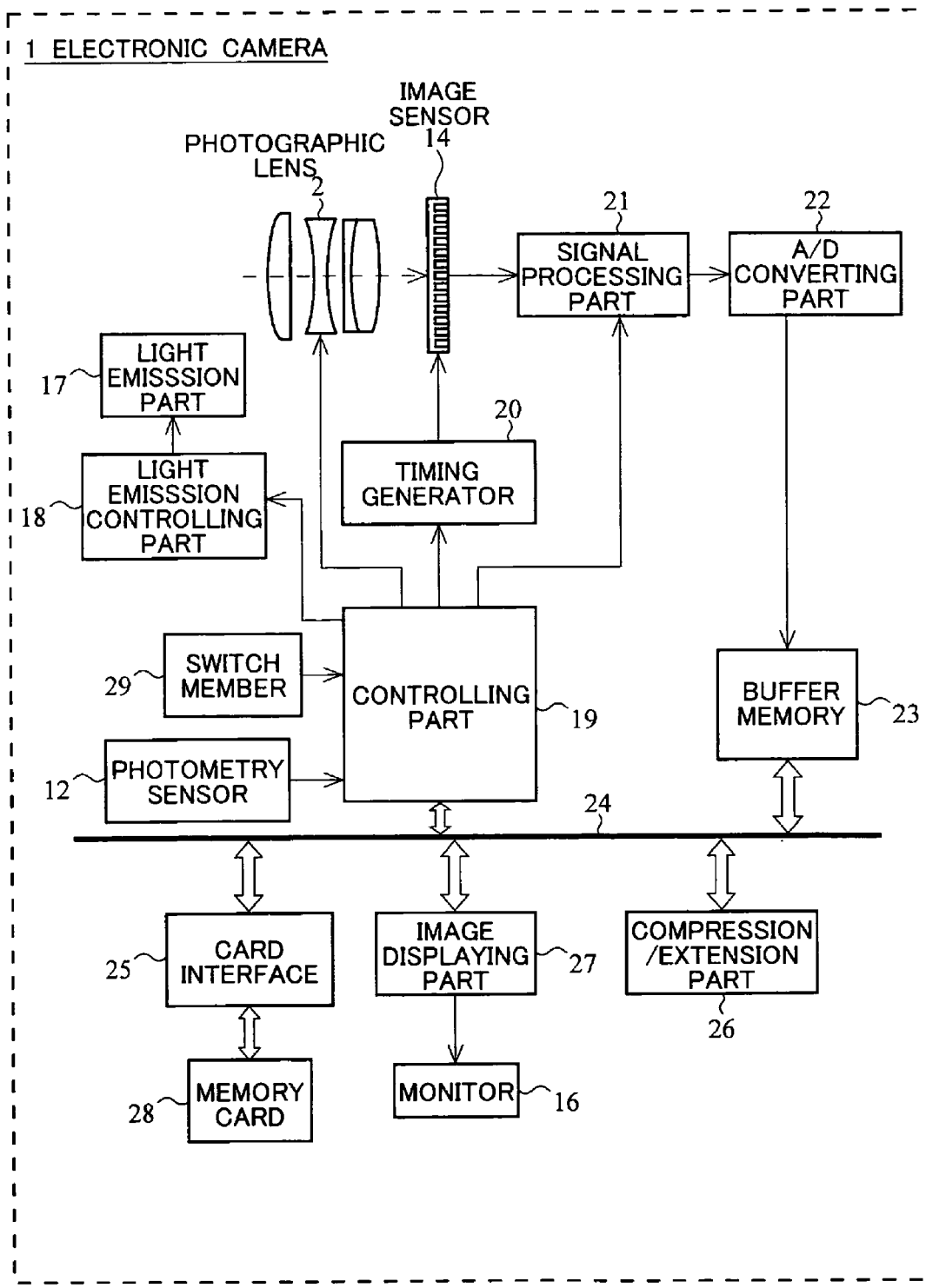
FIG. 3 is a functional block diagram of the electronic camera 1 of the present embodiment.

FIG. 3 is a functional block diagram of the electronic camera 1 of the present embodiment. As illustrated in FIG. 3, in addition to the configuration of FIG. 1, the electronic camera 1 further includes a timing generator 20, a signal processing part 21, an A/D converting part 22, a buffer memory 23, a bus 24, a card interface 25, a compression/extension part 26, and an image displaying part 27. The timing generator 20 supplies an output pulse to the image sensor 14. Moreover, image data generated by the image sensor 14 is temporarily stored on the buffer memory 23 through the signal processing part 21 (a gain adjusting part corresponding to imaging sensitivity is included) and the A/D converting part 22. The buffer memory 23 is coupled to the bus 24, to which the card interface 25, the controlling part 19 described in FIG. 1, the compression/extension part 26, and the image displaying part 27 are coupled. The card interface 25 is coupled to a detachable memory card 28 and records image data on the memory card 28. Moreover, switch members 29 (un-illustrated release buttons and the like are included) of the electronic camera 1, the timing generator 20, and the photometry sensor 12 are coupled to the controlling part 19. Further, the image displaying part 27 displays an image or the like on the monitor 16 disposed to the back surface of the electronic camera 1.

Moreover, the electronic camera 1 includes a gradation non-compression mode where dark area gradation of the image data is not corrected and a gradation compression mode where dark area gradation of the image data is corrected. In which mode shooting is performed, is selected in advance by a user through the switch members 29. Moreover, in the gradation compression mode, the magnitude of the gradation compression amount (lightness improvement amount) can be set into either two levels of large/small or automatic. The setting is also performed by the user through the switch members 29 in advance.

Operation at the time of shooting of the electronic camera 1 having the above-described configuration will be described with reference to the flow charts illustrated in FIGS. 4 to 6.

At Operation S1, the controlling part 19 calculates photometry depending on a photometry result by the photometry sensor 12. The photometry calculation will be described with reference to the flow chart illustrated in FIG. 5.

At Operation S11, the controlling part 19 recognizes the gradation compression mode.

At Operation S12, the controlling part 19 acquires the photometry result from the photometry sensor 12. As illustrated in FIG. 2, the photometry sensor 12 performs photoelectric conversion on incident light, and outputs five brightness values Bv[1] to Bv[5] corresponding to the five divided regions, respectively.

At Operation S13, the controlling part 19 calculates the average brightness value BvMean, the maximum brightness value BvMax, and a central part brightness value BvC based on the photometry result acquired at Operation S12. The average brightness value BvMean, the maximum brightness value BvMax, and the central part brightness value BvC are obtained by the following formulas, respectively.

$$BvMean=(Bv[1]+Bv[2]+Bv[3]+Bv[4]+Bv[5])/5 \quad \text{(Formula 1)}$$

$$BvMax=MAX(Bv[1],Bv[2],Bv[3],Bv[4],Bv[5]) \quad \text{(Formula 2)}$$

$$BvC=Bv[1] \quad \text{(Formula 3)}$$

At Operation S14, the controlling part 19 calculates an exposure control value BvCntl based on the average brightness value BvMean, the maximum brightness value BvMax, and the central part brightness value BvC, which are calculated at Operation S13. The exposure control value BvCntl is obtained by the following formula.

$$BvCntl=k1 \cdot BvMean+k2 \cdot BvMax+k3 \cdot BvC+k4 \quad \text{(Formula 4)}$$

In Formula 4, k1, k2, and k3 are coefficients each indicating weight of the average brightness value BvMean, the maximum brightness value BvMax, and the central part brightness value BvC. Moreover, k4 is a constant term. k1 to k4 are numbers that depend on the average brightness value BvMean. An example of k1 to k4 is shown in the following Table 1.

TABLE 1

|  | k1 | k2 | k3 | k4 |
|---|---|---|---|---|
| BvMean ≦ Bv4 | 0.5 | 0 | 0.5 | 0 |
| Bv4 < BvMean | 0.3 | 0.2 | 0.5 | −0.5 |

As shown in Table 1, when the average brightness value BvMean satisfies: BvMean≦Bv4, the weight of the average brightness value BvMean and the weight of the central part brightness value BvC are set to 0.5, respectively, and the weight and the constant term of the maximum brightness value BvMax are set to 0. On the other hand, when the average brightness value BvMean satisfies: BvMean>Bv4, the weight of the average brightness value BvMean is set to 0.3, the weight of the maximum brightness value BvMax is set to 0.2, the weight of the central part brightness value BvC is set to 0.5, and the constant term is set to −0.5. Coefficients in Table 1 are shown as an example, and they are empirically determined so as to obtain a better image on various sample scenes.

At Operation S15, the controlling part 19 determines whether the mode is a gradation compression mode or not. If determining that the mode is the gradation compression mode, the controlling part 19 will proceed to Operation S16. On the other hand, if determining that the mode is not the gradation compression mode (gradation non-compression mode), the controlling part 19 will complete processing of photometry calculation and proceed to Operation S2 in FIG. 4.

At Operation S16, the controlling part 19 selects coefficients k5 to k8, depending on the gradation compression mode recognized at Operation S11. k5 to k8 are coefficients used for the calculation of a correction value dBv mentioned later. The correction value dBv is obtained by the following formula.

$$dBv = k5 \cdot BvMean + k6 \cdot BvMax + k7 \cdot BvC + k8 \quad \text{(Formula 5)}$$

In Formula 5, k5, k6 and k7 are coefficients indicating the weight of the average brightness value BvMean, the weight of the maximum brightness value BvMax, and the weight of the central part brightness value BvC, respectively. Moreover, k8 is a constant term. k5 to k8 are numbers that depend on the average brightness value BvMean and the gradation compression mode. Examples of k5 to k8 are shown in the following Table 2.

TABLE 2

| GRADATION COMPRESSION MODE | | k5 | k6 | k7 | k8 |
|---|---|---|---|---|---|
| LARGE | BvMean ≦ Bv4 | 0.004 | 0 | 0.020 | 0.050 |
|  | Bv4 < BvMean | 0.007 | 0.010 | 0.005 | 0.030 |
| SMALL | BvMean ≦ Bv4 | 0.010 | 0 | 0.005 | 0.180 |
|  | Bv4 < BvMean | 0.020 | 0.025 | 0.015 | 0.130 |
| AUTOMATIC | BvMean ≦ Bv4 | 0.015 | 0 | 0.007 | 0.240 |
|  | Bv4 < BvMean | 0.025 | 0.030 | 0.020 | 0.200 |

Coefficients in Table 2 are shown as an example, and they are empirically determined so as to obtain a better image on various sample scenes. The controlling part 19 selects coefficients k5 to k8 according to Table 2.

At Operation S17, the controlling part 19 calculates the correction value dBv, using the average brightness value BvMean, the maximum brightness value BvMax, and the central part brightness value BvC, each obtained at Operation S13, above-mentioned Formula (5), and the coefficients k5 to k8 each selected at Operation S16.

At Operation S18, the controlling part 19, based on the correction value dBv calculated at Operation S17, corrects the exposure control value BvCntl calculated at Operation S14. Correction of the exposure control value BvCntl is performed by the following formula.

$$BvCntl(\text{after correction}) = BvCntl + dBv \quad \text{(Formula 6)}$$

Figure 4:
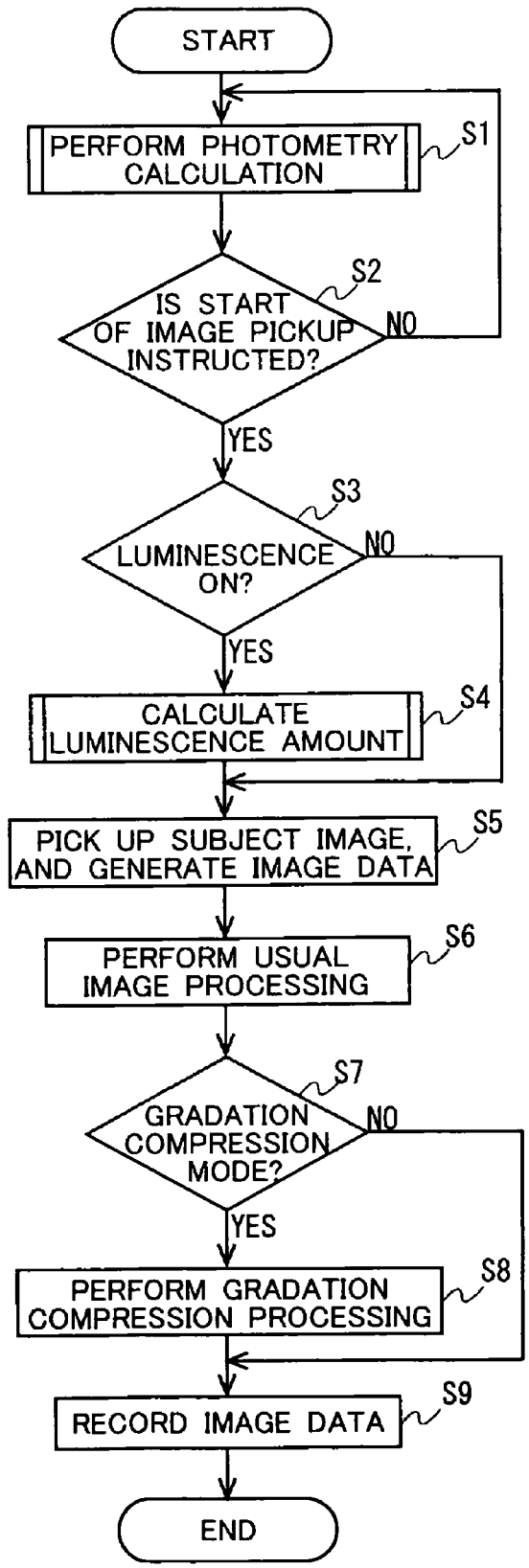
FIG. 4 is a flow chart illustrating an operation at the time of shooting of the electronic camera 1.

After performing the above-described photometry calculation, the controlling part 19 will proceed to Operation S2 in FIG. 4. In addition, when, at Operation S15, determining that the mode is not a gradation compression mode (a gradation non-compression mode), the controlling part 19 will use the exposure control value BvCntl calculated at Operation S14 for subsequent processing without correcting it.

After completing photometry calculation, at Operation S2, the controlling part 19 determines whether or not start of shooting is instructed by the user through the switch members 29. The controlling part 19 repeats the photometry calculation described at Operation S1 until determining that the start of shooting is instructed and will proceed to Operation S3 if determining that the start of shooting is instructed.

At Operation S3, the controlling part 19 determines whether or not luminescence by the light emission part 17 is ON. If determining that luminescence by the light emission part 17 is ON, the controlling part 19 will proceed to Operation S4. On the other hand, if determining that luminescence by the light emission part 17 is not ON (luminescence by the light emission part 17 is OFF), the controlling part 19 will proceed to Operation S5 mentioned later.

At Operation S4, the controlling part 19 calculates the luminescence amount. The calculation of the luminescence amount will be described with reference to the flow chart illustrated in FIG. 6.

At Operation S21, the controlling part 19 recognizes the gradation compression mode.

At Operation S22, the controlling part 19, by controlling the light emission controlling part 18, performs monitor light emission by the light emission part 17. The luminescence amount at that time is a predetermined small luminescence amount.

At Operation S23, the controlling part 19 acquires the photometry result from the photometry sensor 12. The photometry result contains fixed light components. The photometry sensor 12 performs photoelectric conversion on incident light, and outputs five brightness values Bv [1] to Bv [5] corresponding to the five divided regions as illustrated in FIG. 2, respectively.

At Operation S24, the controlling part 19, based on the brightness values Bv[1] to Bv[5] acquired at Operation S23, calculates amounts of received reflected light R[1] to R[5] from which the above-mentioned fixed light components are removed.

At Operation S25, the controlling part 19, based on the amounts of received reflected light R[1] to R[5] calculated at Operation S24, calculates the luminescence amount IL in the light emission part 17. A specific method for calculating the luminescence amount IL is similar to that of a known technology.

At Operation S26, the controlling part 19 determines whether or not the mode is the gradation compression mode. If determining that the mode is the gradation compression mode, the controlling part 19 will proceed to Operation S27. On the other hand, if determining that the mode is not the gradation compression mode (gradation non-compression mode), the controlling part 19 will complete processing of photometry amount calculation and proceed to Operation S5 in FIG. 4.

At Operation S27, the controlling part 19 acquires the correction value dBv (refer to Operation S17 in FIG. 5) obtained by photometry amount calculation.

At Operation S28, the controlling part 19, based on the correction value dBv acquired at Operation S27, corrects the luminescence amount IL calculated at Operation S25. The luminescence amount IL is corrected by the following formula.

$$IL(\text{after correction}) = IL \cdot 2^{-dBv} \quad \text{(Formula 7)}$$

By correcting the luminescence amount IL calculated at Operation S25 by Formula 7, correction for decreasing the luminescence amount IL based on the correction value dBv will be performed.

After performing the above-described luminescence amount calculation, the controlling part 19 will proceed to Operation S5 in FIG. 4. In addition, when, at Operation S26, determining that the mode is not a gradation compression mode (a gradation non-compression mode), the controlling part 19 will use the luminescence amount IL calculated at Operation S25 for subsequent processing without correcting it.

After completing calculation of the luminescence amount, at Operation S5, the controlling part 19 controls each of the parts, and picks up the subject image by the image sensor 14 and generates image data based on the result of photometry calculation performed at Operation S1. In addition, at Operation S3, if determining that luminescence is ON, the controlling part 19, controls the light emission controlling part 18, and while synchronizing with image pickup, causes the light emission part 17 to emit light. The light emission is performed based on the calculation result of the luminescence amount performed at Operation S4. Then, the image data generated by the image sensor 14 is temporarily stored on the buffer memory 23, through the signal processing part 21 and the A/D converting part 22.

At Operation S6, the controlling part 19, reads out the image data from the buffer memory 23, and performs usual image processing. The usual image processing is processing such as white balance adjustment, interpolation, color tone correction processing, and gradation conversion processing. Since, a specific method for each processing is similar to that of a known technology, description thereof will be omitted.

At Operation S7, the controlling part 19 determines whether or not the mode is the gradation compression mode. Then, if determining that the mode is the gradation compression mode, the controlling part 19 will proceed to Operation S8. On the other hand, if determining that the mode is not the gradation compression mode (gradation non-compression mode), the controlling part 19 will proceed to Operation S9 described later.

At Operation S8, the controlling part 19 performs gradation compression processing on the image data that is subjected to usual image processing at Operation S6.

Figure 7:
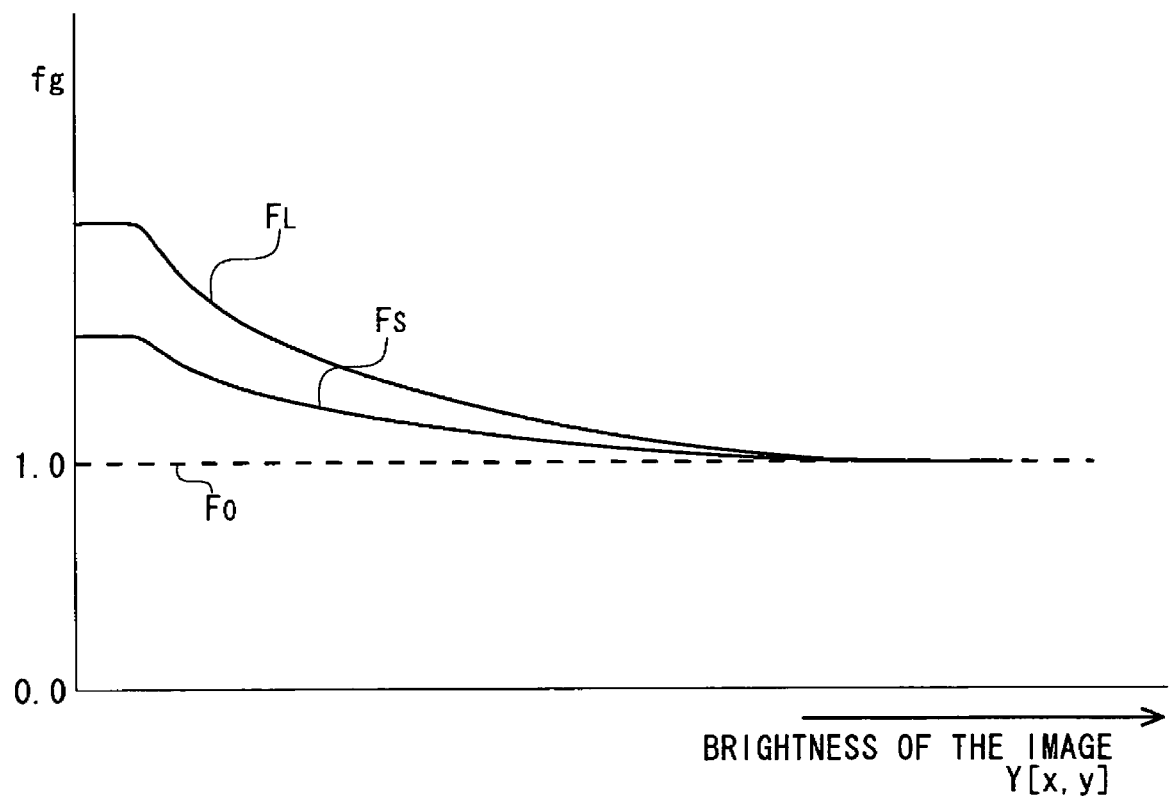
FIG. 7 is a graph showing a gain improving function fg of gradation compression.

FIG. 7 is a graph showing the gain improving function fg of gradation compression. The gain improving function fg has a gain that depends on the brightness Y of the image, as shown in FIG. 7. As the brightness Y becomes smaller (as the neighboring range including a pixel to be processed becomes darker), the gain improving function fg will be larger. On the contrary, as the brightness Y becomes larger (as the neighboring range including a pixel to be processed becomes lighter), the gain improving function fg will be nearer to 1. In addition, in FIG. 7, $F_S$ indicates the gain improving function fg used when the gradation compression mode is set to be "small", and $F_L$ indicates the gain improving function fg used when the gradation compression mode is set to be "large". In addition, when the gradation compression mode is set to be "automatic", the controlling part 19 determines the gain improving function fg automatically, depending on the brightness distribution in the image data generated at Operation S5. For example, the controlling part 19 may also have a configuration where the image data is divided into a plurality of regions, brightness difference between a region having maximum brightness and a region having minimum brightness is obtained, and the gain improving function fg is determined depending on the brightness difference. Moreover, the controlling part 19 may also have a configuration where the gain improving function fg is determined depending on the contrast of a light part. Moreover, at Operation S7, when determining that the mode is not the gradation compression mode (gradation non-compression mode), if gradation compression processing can not be skipped due to the configuration of a processing circuit in the controlling part 19, gain improving function fg indicated by $F_0$ in FIG. 7 is used.

Calculation of gradation compression in each pixel R [x, y], G [x, y], and B [x, y] is performed by following Formula 8 to Formula 11.

$$Y[x, y] = kr \cdot R[x, y] + kg \cdot G[x, y] + kb \cdot B[x, y] \quad \text{(Formula 8)}$$

$$Rc[x, y] = \quad \text{(Formula 9)}$$
$$R[x, y] \cdot fg\left\{\sum_{i=-d}^{d}\sum_{j=-d}^{d}(Y[x+i, y+j] \cdot Lpw[(i^2+j^2)^{1/2}])\right\}$$

$$Gc[x, y] = \quad \text{(Formula 10)}$$
$$G[x, y] \cdot fg\left\{\sum_{i=-d}^{d}\sum_{j=-d}^{d}(Y[x+i, y+j] \cdot Lpw[(i^2+j^2)^{1/2}])\right\}$$

$$Bc[x, y] = \quad \text{(Formula 11)}$$
$$B[x, y] \cdot fg\left\{\sum_{i=-d}^{d}\sum_{j=-d}^{d}(Y[x+i, y+j] \cdot Lpw[(i^2+j^2)^{1/2}])\right\}$$

Figure 8:
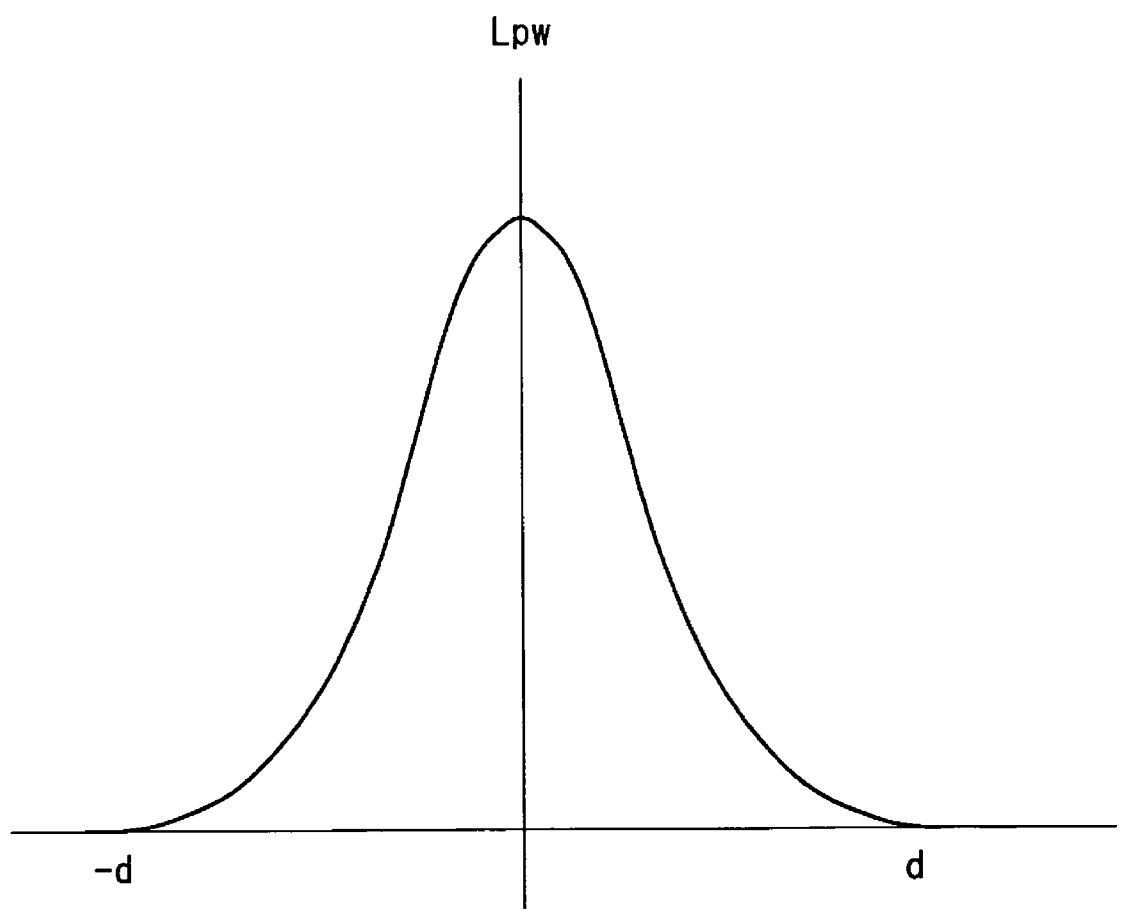
FIG. 8 is a graph showing a characteristic of a low pass filter.

Where, Y in Formula 8 to Formula 11 indicates the brightness value of a pixel to be noted. Moreover, kr, kg, and kb in Formula 8 are predetermined coefficients. Moreover, Lpw in Formula 9 to Formula 11 is a low pass filter around the pixel to be noted, and the low pass filter has a characteristic shown in FIG. 8. Moreover, fg in Formula 9 to Formula 11, corresponds to the above-mentioned gain improving function fg.

At Operation S9, the controlling part 19 records the image data that is subjected to gradation compression processing at Operation S8, or the image data that is subjected to usual image processing at Operation S6 on the memory card 28 through the card interface 25, and completes a series of processing. In addition, before recording the image data on the memory card 28, the controlling part 19 may subject the image data to image compression processing JPEG compression processing etc.) through the compression/extension part 26, if necessary.

As described above, in accordance with the present embodiment, the imaging apparatus includes a first photographic mode where correction of the dark area gradation of image data is not performed and a second photographic mode where correction of the dark area gradation of image data is performed, wherein, by calculating the maximum brightness value, the average brightness value, and the representative brightness value corresponding to the central part of a subject are calculated based on the output of the photometry part and by adding the calculated results by weighting addition, a brightness value for exposure control is calculated, and if the second photographic mode is selected, by adding the calculated results by weighting addition, a correction value is determined and the brightness value for exposure control is corrected based on the correction value. Therefore, optimum exposure adjustment that depends on correction of the dark area gradation can be performed. Therefore, image pickup enables generating of an image that is close to the image viewed by a user.

Moreover, in accordance with the present embodiment, depending on the lightness improvement amount in correction of dark area gradation, each weight at the time of determining the correction value is changed. Therefore, optimum exposure adjustment that depends on the content of correction of dark area gradation can be performed.

Moreover, in accordance with the present embodiment, when the brightness value for exposure control is calculated, a first fixed value is added to a result obtained by adding the calculated results by weighting addition, and if a second photographic mode is selected, at the time of calculating the correction value, a second fixed value is added to the result obtained by adding the calculated results by weighting addition. Moreover, depending on the lightness improvement amount in correction of dark area gradation, the first fixed value and the second fixed value are changed. Therefore, optimum exposure adjustment that depends on the content of correction of dark area gradation can be performed.

Moreover, in accordance with the present embodiment, when the luminescence amount is calculated during performing light emission by the light emission part, if the second photographic mode is selected, the luminescence amount is corrected based on the above-mentioned correction value. Therefore, at the time of light emission by the light emission part, image pickup can be performed at an optimum luminescence amount that depends on the correction of dark area gradation.

In addition, in the present embodiment, although, an example is described, in which the exposure control value BvCntl and the correction value dBv are calculated based on the average brightness value BvMean, the maximum brightness value BvMax, and the central part brightness value BvC, it is not always necessary to use all of the average brightness value BvMean, the maximum brightness value BvMax, and central part brightness value BvC. For example, by calculating at least one of the average brightness value BvMean, the maximum brightness value BvMax, and the central part brightness values BvC, the exposure control value BvCntl and the correction value dBv may be calculated based on the calculated results.

Figure 5:
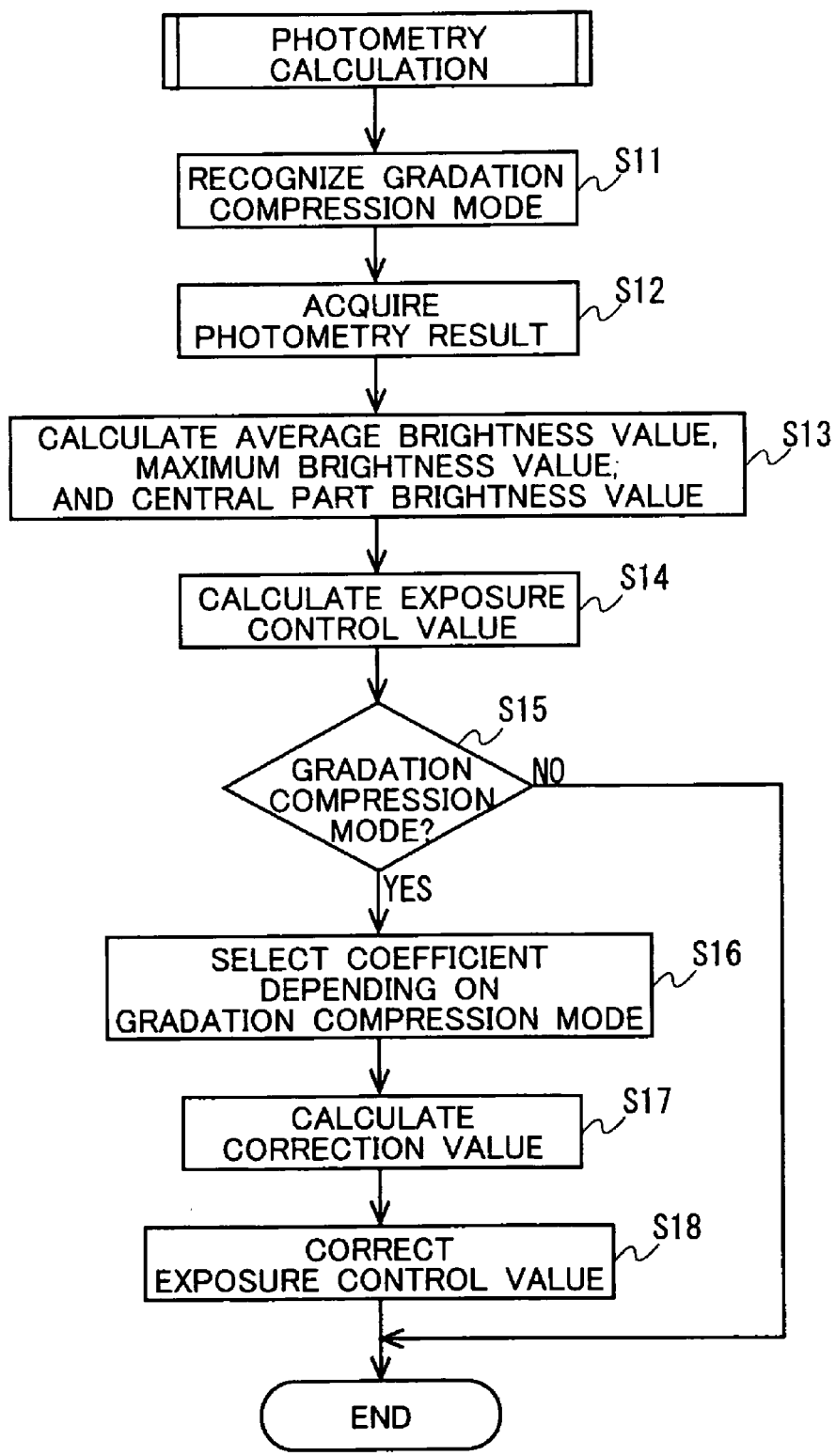
FIG. 5 is another flow chart illustrating an operation at the time of shooting of the electronic camera 1 (continuation).
Figure 6:
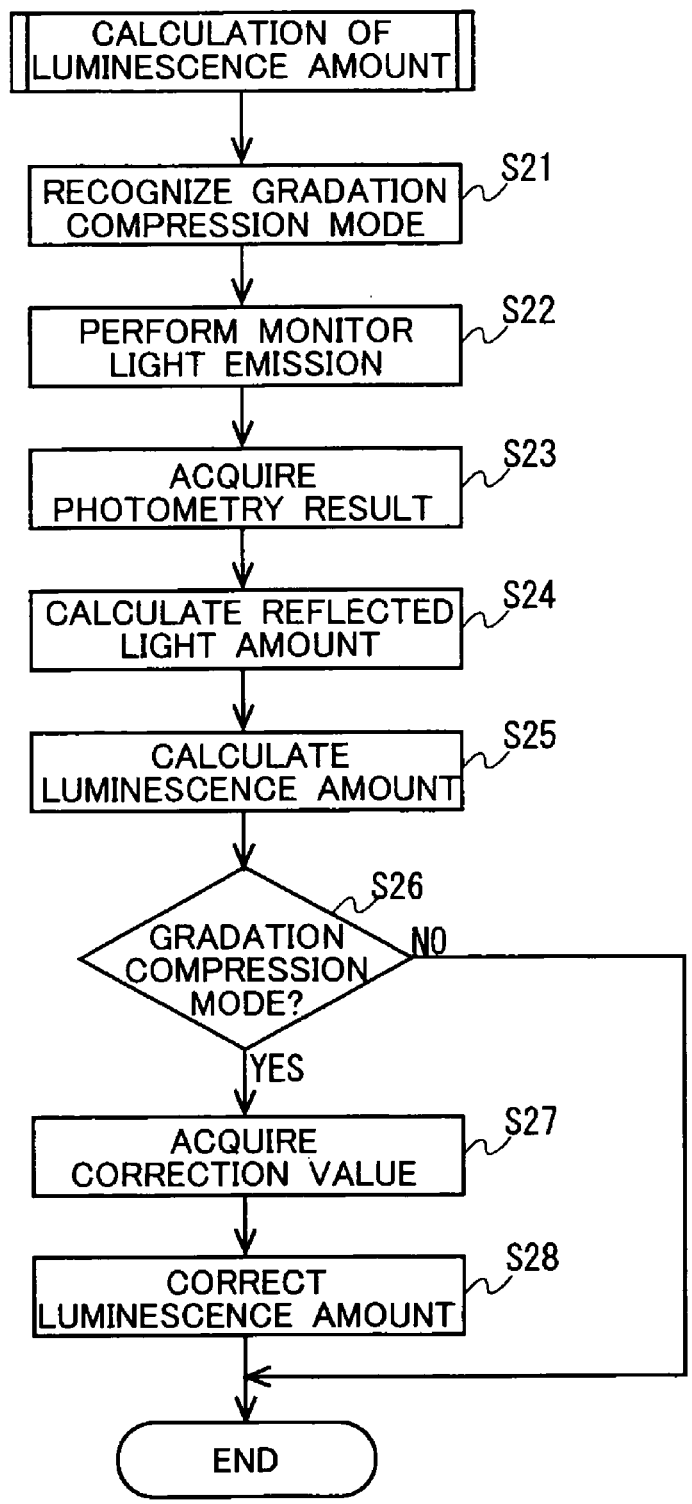
FIG. 6 is another flow chart illustrating an operation at the time of shooting of the electronic camera 1 (continuation).

Moreover, in the present embodiment, although, an example is described, in which, at Operation S13 of FIG. 5, all of the average brightness value BvMean, the maximum brightness value BvMax, and the central part brightness value BvC are calculated, a configuration may be used in which selection of coefficients (k1 to k3, and k5 to k7) (refer to Table 1 and Table 2) is performed in advance, and when the coefficient is zero, calculation of corresponding brightness value is eliminated.

Moreover, in the present embodiment, although, an example is exemplified and described, where a five-division photometry sensor illustrated in FIG. 2 is used as the photometry sensor 12, the present embodiment is not limited to the example.

Moreover, in the above-mentioned embodiment, an example is described, in which technologies of the present embodiment are realized in the electronic camera 1. However, the present embodiment is not limited to the example. For example, the present embodiment can also be applied to a device such as a compact type electronic camera and a movie camera shooting a moving image, in a similar manner.

Moreover, image processing described in the present embodiment may be realized in terms of software by a computer and an image processing program. In this case, a configuration may be used in which a part or all of processing after Operation S6 described in the flow chart in FIG. 4 is realized by the computer. In order to realize the image processing by the computer, together with the image data, information such as information whether the mode is gradation compression mode or not, or information indicating the gradation compression amount should be supplied to the computer. Such information can be supplied by utilizing EXIF information etc. on the image data. Such a configuration enables the same processing as the processing of the present embodiment to be performed.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An imaging apparatus, comprising:
a photometry unit performing photometry of a subject;
an exposure calculating unit setting an exposure condition based on a photometry result of said photometry unit;
an image pickup unit picking up an image of said subject according to said exposure condition and generating image data;
a selecting unit selecting any one of a first photographic mode where correction of dark area gradation of said image data is not performed and a second photographic mode where correction of dark area gradation of said image data is performed; and
a correcting unit performing correction of improving lightness of dark area gradation of said image data generated by said image pickup unit when said second photographic mode is selected, wherein
said exposure calculating unit
calculates a brightness value for exposure control as said exposure condition by calculating at least one of a maximum brightness value, an average brightness value, and a representative brightness value corresponding to the central part of said subject based on an output of said photometry unit and by adding calculated results by weighted addition; and
determines a correction value by adding said calculated results by weighted addition and corrects said brightness value for exposure control based on said correction value if said second photographic mode is selected.

2. The imaging apparatus according to claim 1, wherein said exposure calculating unit changes each weight when determining said correction value, depending on said lightness improvement amount in said correcting unit.

3. The imaging apparatus according to claim 1, wherein said exposure calculating unit
adds a first fixed value to a result obtained by adding said calculated results by weighting addition when calculating said brightness value for exposure control; and
adds a second fixed value to a result obtained by adding said calculated results by weighting addition while calculating said correction value if said second photographic mode is selected.

4. The imaging apparatus according to claim 3, wherein said exposure calculating unit changes at least one of said first fixed value and said second fixed value, depending on said lightness improvement amount in said correcting unit.

5. The imaging apparatus according to claim 1, further comprising:

a light emission unit illuminating the subject; and a luminescence amount calculating unit calculating luminescence amount when performing light emission by said light emission unit, wherein said luminescence amount calculating unit corrects said luminescence amount based on said correction value if said second photographic mode is selected.

* * * * *